(12) United States Patent
Liu

(10) Patent No.: US 11,186,163 B1
(45) Date of Patent: Nov. 30, 2021

(54) HUB MOTOR ASSEMBLY

(71) Applicant: PRAXIS INTERNATIONAL PTE. LTD., Singapore (SG)

(72) Inventor: Fang-Ling Liu, Huatan Township, Changhua Counnty (TW)

(73) Assignee: PRAXIS INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/018,639

(22) Filed: Sep. 11, 2020

(30) Foreign Application Priority Data

May 22, 2020 (TW) .................................. 10911721.5

(51) Int. Cl.
| | |
|---|---|
| *B60K 7/00* | (2006.01) |
| *B60B 27/00* | (2006.01) |
| *B60B 27/04* | (2006.01) |
| *B60K 17/02* | (2006.01) |
| *B60K 17/26* | (2006.01) |
| *B60K 17/04* | (2006.01) |

(52) U.S. Cl.
CPC .............. *B60K 7/00* (2013.01); *B60B 27/001* (2013.01); *B60B 27/0005* (2013.01); *B60B 27/0026* (2013.01); *B60B 27/047* (2013.01); *B60K 17/02* (2013.01); *B60K 17/043* (2013.01); *B60K 17/26* (2013.01); *B60K 2007/0092* (2013.01)

(58) Field of Classification Search
CPC .......... B60K 7/00; B60K 17/26; B60K 17/02; B60K 17/043; B60K 2007/0092; B60B 27/001; B60B 27/0005; B60B 27/0026; B60B 27/047
See application file for complete search history.

(56) References Cited

U.S. PATENT DOCUMENTS

| | | | | |
|---|---|---|---|---|
| 3,812,928 A | * | 5/1974 | Rockwell ............. | B60K 17/046 180/65.51 |
| 3,897,843 A | * | 8/1975 | Hapeman ............... | B60K 17/14 180/65.51 |
| 5,246,082 A | * | 9/1993 | Alber ................... | B60K 7/0007 180/65.51 |
| 5,633,544 A | * | 5/1997 | Toida ..................... | H02K 29/08 310/67 R |
| 5,691,584 A | * | 11/1997 | Toida ..................... | H02K 11/33 310/67 R |
| 6,276,475 B1 | * | 8/2001 | Nakanosono ............ | B62M 6/65 180/65.8 |
| 6,296,072 B1 | * | 10/2001 | Turner ................... | B62M 11/18 180/220 |
| 6,355,996 B1 | * | 3/2002 | Birkestrand ............ | B60L 50/66 310/54 |
| 6,749,532 B2 | * | 6/2004 | Wachauer .............. | H02K 7/116 475/5 |

(Continued)

*Primary Examiner* — Jacob B Meyer
(74) *Attorney, Agent, or Firm* — Hamre, Schumann, Mueller & Larson, P.C.

(57) ABSTRACT

A hub motor assembly includes a hub axle, a hub shell, a motor unit, a cycloidal speed reducer, and a one-way clutch unit. When an output shaft of the motor unit rotates in a first direction about an axial line, a cycloidal wheel of the cycloidal speed reducer is driven to produce an eccentric cycloidal motion relative to the axial line, to thereby drive rotation of the hub shell in the first direction. When the output shaft rotates in a second direction opposite to the first direction, the hub shell is prevented from rotating with the output shaft.

17 Claims, 11 Drawing Sheets

(56) References Cited

U.S. PATENT DOCUMENTS

| | | | | |
|---|---|---|---|---|
| 6,974,399 B2* | 12/2005 | Lo | B62M 7/12 475/5 |
| 7,118,506 B2* | 10/2006 | Zheng | B62D 5/008 475/18 |
| 7,315,099 B2* | 1/2008 | Steffen | B60K 7/0007 180/65.51 |
| 7,329,202 B2* | 2/2008 | Chung | F16H 13/04 475/180 |
| 7,357,743 B2* | 4/2008 | Mao | H02K 1/146 180/65.7 |
| 7,472,770 B2* | 1/2009 | Tomoshige | B62M 7/12 180/65.51 |
| 7,658,247 B2* | 2/2010 | Carter | H02J 7/345 180/65.24 |
| 7,669,684 B2* | 3/2010 | Rogg | B62D 7/023 180/264 |
| 7,717,203 B2* | 5/2010 | Yoshino | B60K 7/0007 180/65.51 |
| 7,886,858 B2* | 2/2011 | Ai | F16H 1/2818 180/65.51 |
| 8,186,467 B2* | 5/2012 | Yoshino | B60K 7/0007 180/65.51 |
| 8,210,974 B2* | 7/2012 | Moeller | B62M 6/65 475/5 |
| 8,245,804 B2* | 8/2012 | Rooij | B62M 6/65 180/65.51 |
| 8,348,798 B2* | 1/2013 | Lo | B62M 6/65 475/149 |
| 8,362,660 B2* | 1/2013 | Hunter | H02K 7/075 310/20 |
| 8,519,575 B2* | 8/2013 | Hunter | B60G 17/02 310/20 |
| 8,585,062 B2* | 11/2013 | Hunter | B60G 3/01 280/5.5 |
| 8,624,699 B2* | 1/2014 | Hunter | H01F 41/041 336/200 |
| 8,636,095 B2* | 1/2014 | Ito | B62M 6/65 180/206.6 |
| 8,702,550 B1* | 4/2014 | Christensen | F16D 41/125 475/154 |
| 8,766,493 B2* | 7/2014 | Hunter | H02K 16/00 310/12.25 |
| 8,973,716 B2* | 3/2015 | McKay | B62B 5/04 188/1.12 |
| 9,090,142 B2* | 7/2015 | Lee | B60K 7/0007 |
| 9,302,734 B2* | 4/2016 | Getta | B62M 11/145 |
| 2005/0176542 A1* | 8/2005 | Lo | B60L 50/20 475/5 |

* cited by examiner

HUB MOTOR ASSEMBLY

CROSS-REFERENCE TO RELATED APPLICATION

This application claims priority from Taiwanese invention patent application no. 109117215, filed on May 22, 2020.

FIELD

The disclosure relates to a hub motor assembly, more particularly to a hub motor assembly having a high torque-to-volume ratio.

BACKGROUND

U.S. Pat. No. 6,974,399 B2 discloses a conventional electrically driven hub which includes an electrical mechanism including an electrical motor and a planetary gear system connected to the electrical mechanism. A first fixed shaft is connected to the stator of the electrical motor and a second fixed shaft is connected to a second end of the stator of the electrical motor. The first and second fixed shafts are connected to the vehicle frame. A one-way clutch is connected between a cover of the hub and the planetary gear system so that the hub is rotated when the planetary gear system is activated by the motor.

However, the conventional electrically driven hub with the planetary gear system may have a relatively low torque-to-volume ratio. In addition, the first and second fixed shafts may not be sufficiently concentric with each other, which may cause uneven force distribution on the hub.

SUMMARY

An object of the disclosure is to provide a novel hub motor assembly having a relatively high torque-to-volume ratio.

According to the disclosure, a hub motor assembly includes a hub axle, a hub shell, a motor unit, a cycloidal speed reducer, and a one-way clutch unit. The hub axle extends along an axial line. The hub shell is mounted on and rotatable relative to the hub axle. The motor unit is mounted inside the hub shell and includes an output shaft configured to rotate about the axial line for outputting a rotational force. The cycloidal speed reducer is mounted inside the hub shell, and includes an eccentric cam, at least one cycloidal wheel, a positioning plate, a plurality of carrier pins, an annular force-transmitting member, and at least one roller unit. The eccentric cam is mounted on and rotates with the output shaft. The cycloidal wheel is coupled to be driven by the eccentric cam such that when the output shaft outputs the rotational force, the cycloidal wheel is permitted to move about the axial line. The positioning plate is disposed aside of the cycloidal wheel in a direction of the axial line. The carrier pins are mounted on the positioning plate, and are coupled with the cycloidal wheel. The annular force-transmitting member is coupled between the cycloidal wheel and the hub shell. The roller unit includes a plurality of contact rollers, and is coupled between the cycloidal wheel and the annular force-transmitting member. The one-way clutch unit is coupled to the cycloidal speed reducer such that when the output shaft rotates in a first direction about the axial line, the cycloidal wheel is driven to produce an eccentric cycloidal motion relative to the axial line, to thereby drive rotation of the hub shell in the first direction, and such that when the output shaft rotates in a second direction opposite to the first direction, the hub shell is prevented from rotating with the output shaft.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
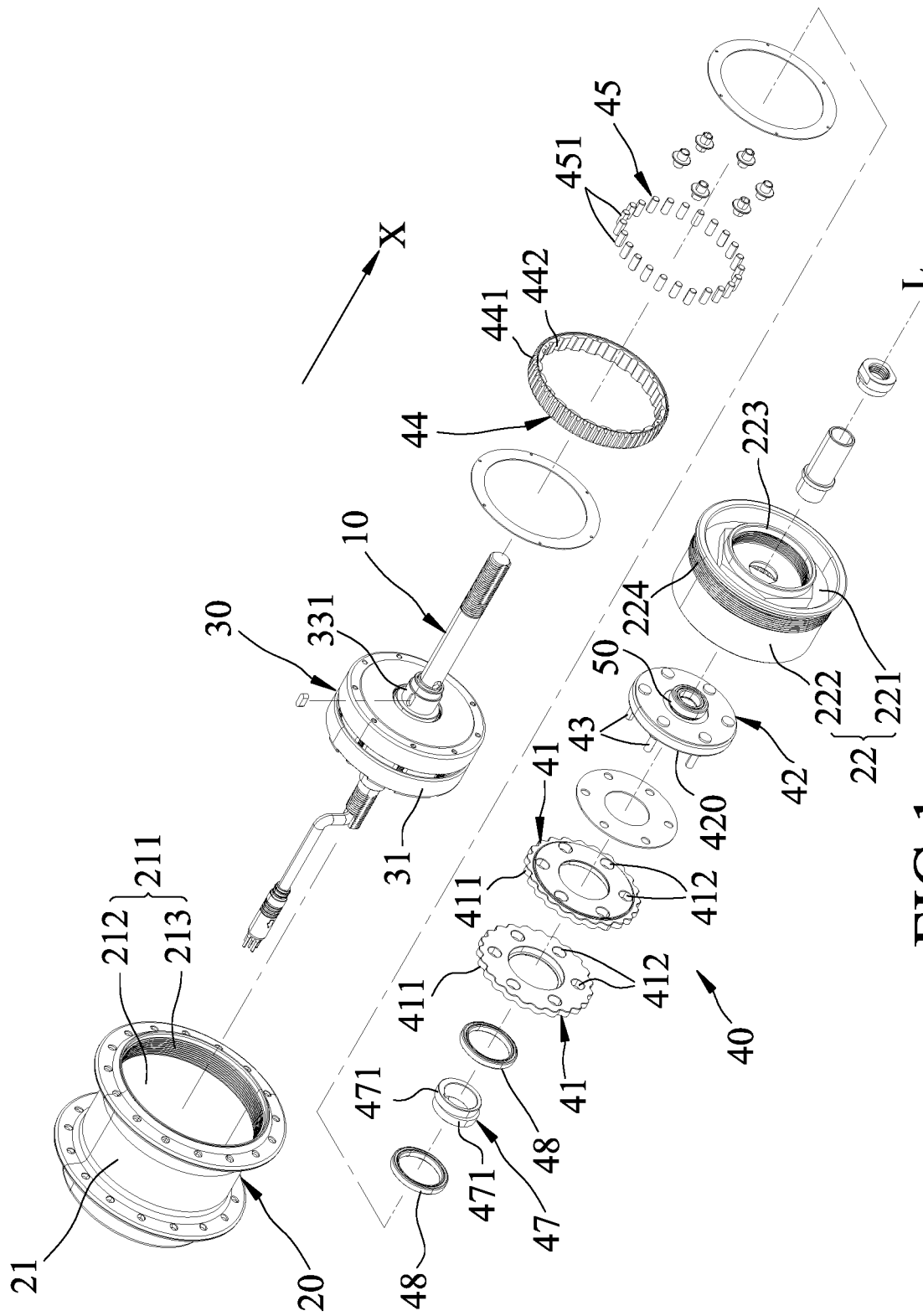
FIG. 1 is an exploded schematic perspective view of a hub motor assembly according to a first embodiment of the disclosure.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 2:
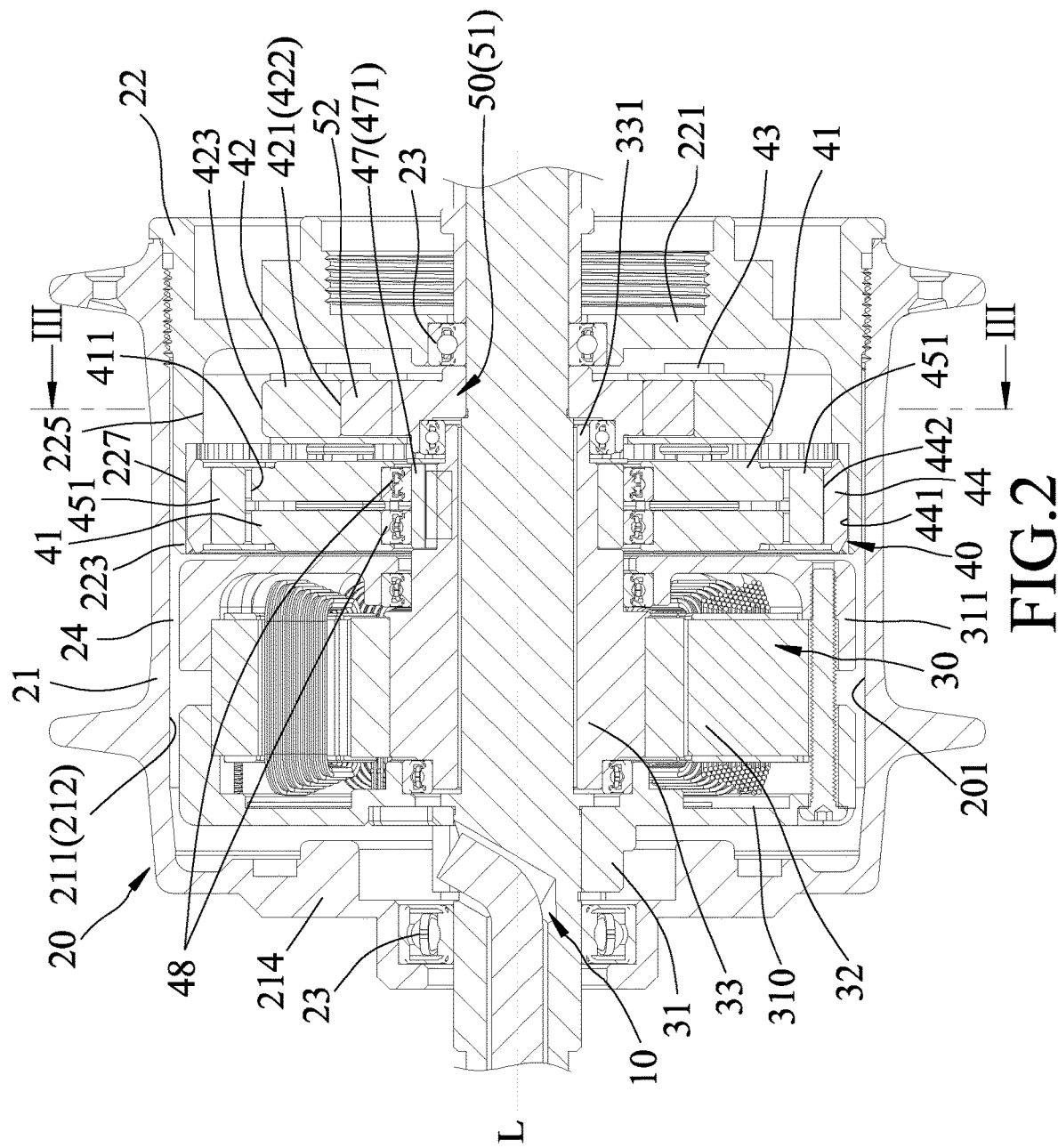
FIG. 2 is a fragmentary cross-sectional view of the first embodiment.
Figure 3:
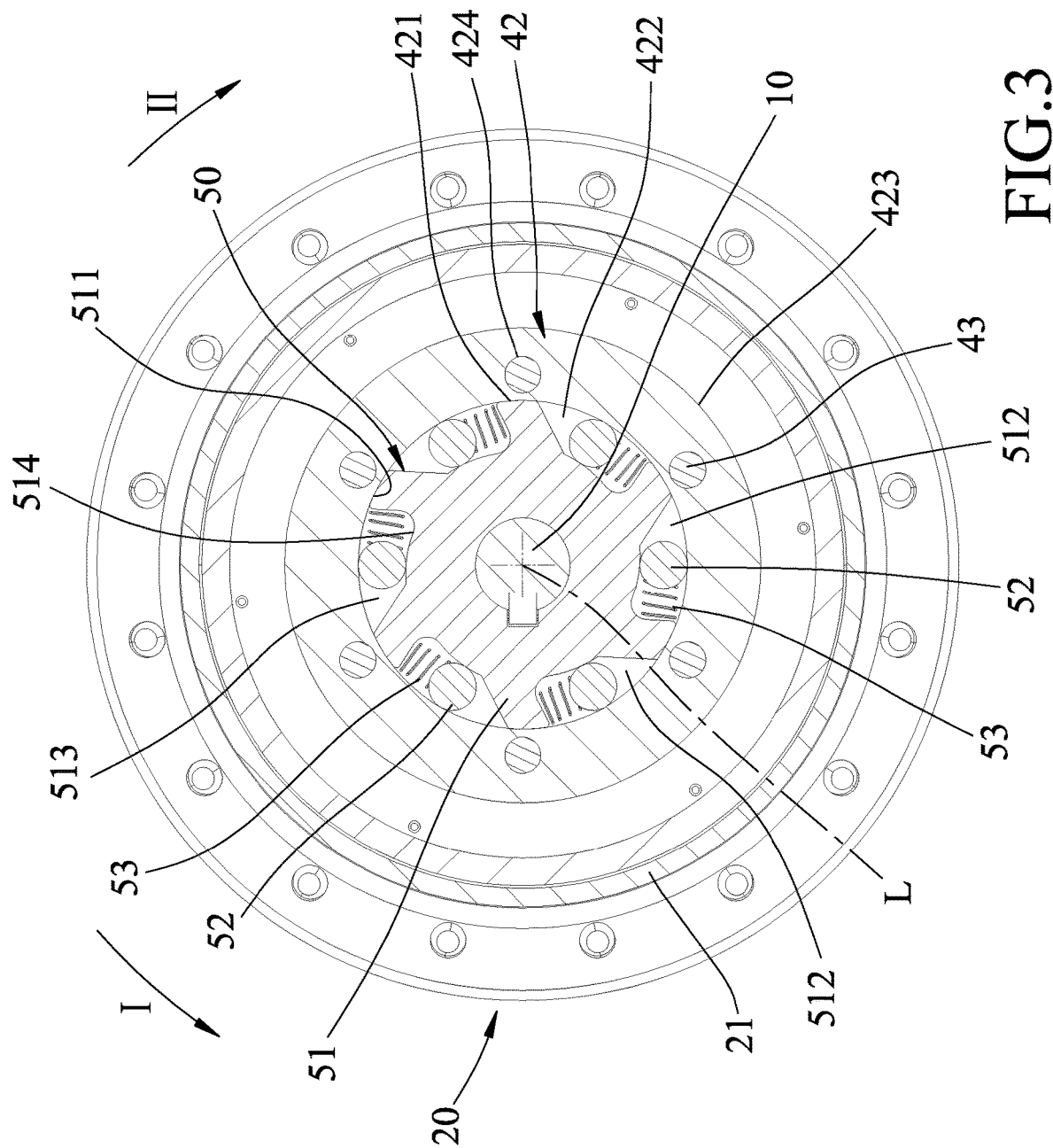
FIG. 3 is a cross-sectional view taken along line III-III of FIG. 2.

Referring to FIGS. 1 to 3, a hub motor assembly according to a first embodiment of the disclosure is shown to include a hub axle 10, a hub shell 20, a motor unit 30, a cycloidal speed reducer 40, and a one-way clutch unit 50.

The hub axle 10 extends along an axial line (L).

The hub shell 20 is mounted on and rotatable relative to the hub axle 10. As shown in FIG. 2, the hub shell 20 includes an inner surrounding surface 201 which surrounds and is spaced apart from the hub axle 10 so as to define a surrounding space 24 therebetween.

In an embodiment shown in FIGS. 1 and 2, the hub shell 20 may include a surrounding wall 21 and an end cap 22. The surrounding wall 21 extends about the axial line (L) and has an inner peripheral surface 211 which includes a front surface region 212 and a rear female threaded region 213.

The end cap 22 includes a base wall 221 and a tubular wall 222. The base wall 221 is formed with an opening 223 configured to permit extension of the hub axle 10 therethrough, and has a male threaded periphery 224 which is configured to be brought into threaded engagement with the rear female threaded region 213 of the surrounding wall 211. The tubular wall 222 is mounted on the end wall 221, and has an inner tubular surface 225 such that when the male threaded periphery 224 is in threaded engagement with the rear female threaded region 213 of the surrounding wall 211, the front surface region 212 of the surrounding wall 21 and the inner tubular surface 225 of the tubular wall 222 cooperatively define the inner surrounding surface 201 of the hub shell 20.

In addition, the hub shell 20 may further include a front end wall 214 extending inwardly and radially from a front surrounding margin of the surrounding wall 21. The front end wall 214 and the end cap 22 are mounted to the hub axle 10 through two bearing members 23 so as to permit the hub shell 20 to be rotatably mounted on the hub axle 10.

In an embodiment shown in FIG. 2, the hub shell 20 has an inner spline 227 formed on the inner tubular surface 225 of the tubular wall 222.

The motor unit 30 is mounted inside the hub shell 20 (i.e., disposed in the surrounding space 24), and includes an output shaft 331 configured to rotate about the axial line (L) for outputting a rotational force. In an embodiment shown in FIG. 2, the output shaft 331 is in a sleeve form and is sleeved on and rotatable relative to the hub axle 10.

In an embodiment shown in FIG. 2, the motor unit 30 may further include a motor casing 31, a stator 32, and a rotor sleeve 33. The motor casing 31 is secured to the hub axle 10, and has a surrounding casing wall 311 which surrounds and is spaced apart from the hub axle 10 to define an inner chamber 310 therebetween. The stator 32 is disposed in the inner chamber 310 and is mounted on the surrounding casing wall 311 to be spaced apart from the hub axle 10. The rotor sleeve 33 is disposed in the inner chamber 310, and is sleeved on and rotatable relative to the hub axle 10 about the axial line (L). The output shaft 331 extends rearwardly from the rotor sleeve 33 to be exposed rearwardly from the motor casing 31 and to rotate with the rotor sleeve 33 so as to output the rotational force. Because the arrangements and operations of the elements in the motor unit 30 are well known in the art, the details thereof are omitted for the sake of brevity.

The cycloidal speed reducer 40 is mounted inside the hub shell 20 (i.e., disposed in the surrounding space 24), and includes an eccentric cam 47, at least one cycloidal wheel 41, a positioning plate 42, a plurality of carrier pins 43, an annular force-transmitting member 44, and a roller unit 45. The eccentric cam 47 is mounted on and rotates with the output shaft 331. The cycloidal wheel 41 is coupled to be driven by the eccentric cam 47 such that when the output shaft 331 outputs the rotational force, the cycloidal wheel 41 is permitted to move about the axial line (L). The positioning plate 42 is disposed aside of the cycloidal wheel 41 in a direction of the axial line (L) (i.e., a front-rear direction (X) shown in FIG. 1). The carrier pins 43 are mounted on the positioning plate 42 and are coupled with the cycloidal wheel 41. The annular force-transmitting member 44 is coupled between the cycloidal wheel 41 and the hub shell 20. The roller unit 45 includes a plurality of contact rollers 451, and is coupled between the cycloidal wheel 41 and the annular force-transmitting member 44.

The one-way clutch unit 50 is coupled to the cycloidal speed reducer 40 such that when the output shaft 331 rotates in a first direction (I) about the axial line (L) (i.e., a counterclockwise direction shown in FIG. 3), the cycloidal wheel 41 is driven to produce an eccentric cycloidal motion relative to the axial line (L), to thereby drive rotation of the hub shell 20 in the first direction (I), and such that when the output shaft 331 rotates in a second direction (II) (i.e., a clockwise direction shown in FIG. 3) opposite to the first direction (I), the hub shell 20 is prevented from rotating with the output shaft 331.

In an embodiment shown in FIGS. 1 and 2, the cycloidal wheel 41 has a plurality of through holes 412 which are angularly displaced from each other. The positioning plate 42 has a forward surface 420 confronting the cycloidal wheel 41. The carrier pins 43 extend from the forward surface 420 of the positioning plate 42 respectively through the through holes 412 of the cycloidal wheel 41 and are angularly displaced from each other to be arranged in a concentric manner with respect to the axial line (L). Each of the carrier pins 43 has an outer dimension smaller than a dimension of a respective one of the through holes 412 of the cycloidal wheel 41 such that when the output shaft 331 rotates in the first direction (I), the cycloidal wheel 41, which is retained on the positioning plate 42 through the carrier pins 43, is permitted to produce the eccentric cycloidal motion. The annular force-transmitting member 44 has an outer rim surface 441 which is coupled to drive rotation of the hub shell 20. The contact rollers 451 are coupled between the annular force-transmitting member 44 and the cycloidal wheel 41, and are angularly displaced from each other about the axial line (L) so as to permit the eccentric cycloidal motion of the cycloidal wheel 41 to be transmitted to the annular force-transmitting member 44 through the contact rollers 451, thereby driving rotation of the hub shell 20.

In an embodiment shown in FIG. 2, the outer rim surface 441 of the annular force-transmitting member 44 is in splined engagement with the inner surrounding surface 201 of the hub shell 20 so as to permit the hub shell 20 to be driven by the annular force-transmitting member 44 to rotate.

In an embodiment shown in FIG. 2, the outer rim surface 441 of the annular force-transmitting member 44 is in splined engagement with the inner spline 227 so as to permit the hub shell 20 to be driven by the annular force-transmitting member 44 to rotate.

In an embodiment shown in FIGS. 1 to 3, the positioning plate 42 has an inner surrounding edge 421 which defines a central bore 422 to permit extension of the hub axle 10 therethrough, an outer surrounding edge 423, and a plurality of pin holes 424 which are located between the inner and outer surrounding edges 421, 423 for retaining the carrier pins 43, respectively. The positioning plate 42 is switchable from a non-rotatable state to a rotatable state. In the non-rotatable state, as shown in FIG. 3, the positioning plate 42 is non-rotatably retained on the hub axle 10 through the one-way clutch unit 50 to permit the eccentric cycloidal motion of the cycloidal wheel 41. In the rotatable state (not shown), the positioning plate 42 is rotatably retained on the hub axle 10 to permit the cycloidal wheel 41 to rotate with the positioning plate 42, so as to prevent rotation of the cycloidal wheel 41 from being transmitted to the annular force-transmitting member 44 through the contact rollers 451.

In an embodiment shown in FIGS. 2 and 3, the one-way 1I clutch unit 50 is disposed in the central bore 422 of the positioning plate 42, and is coupled between the positioning plate 42 and the hub axle 10 such that when the output shaft 331 rotates in the first direction (I), the positioning plate 42 is in the non-rotatable state, and such that when the output shaft 42 rotates in the second direction (II), the positioning plate 42 is switched to the rotatable state.

In an embodiment shown in FIGS. 2 and 3, the one-way clutch unit 50 may include a disc mount 51, a plurality of rolling pins 52, and a plurality of biasing springs 53.

The disc mount 51 is secured on the hub axle 10 and has an outer peripheral surface 511 which is disposed to confront the inner surrounding edge 421 of the positioning plate 42. The outer peripheral surface 511 of the disc mount 51 has a plurality of retaining recesses 512 which are angularly displaced from each other about the axial line (L). Each of the retaining recesses 512 extends about the axial line (L) to terminate at a shallow end region 513 and a deep end region 514 which has a larger depth than the shallow end region 513.

The rolling pins 52 are disposed respectively in the retaining recesses 512, and are movable between an engaging position and a disengaging position. In the engaging position, as shown in FIG. 3, the rolling pins 52 are disposed respectively in the shallow end regions 513 of the retaining recesses 512 to be brought into frictional engagement with the inner surrounding edge 421 of the positioning plate 42, thereby preventing rotation of the positioning plate 42 relative to the hub axle 10. In the disengaging position, the rolling pins 52 are disposed respectively in the deep end regions 514 of the retaining recesses 512 to be disengaged from the inner surrounding edge 421 of the positioning plate 42, thereby permitting rotation of the positioning plate 42 relative to the hub axle 10.

The biasing springs 53 are respectively disposed in the retaining recesses 512 to respectively bias the rolling pins 52 to the engaging position such that when the output shaft 331 rotates in the first direction (I), the rolling pins 52 are kept in the engaging position, and such that when the output shaft 331 rotates in the second direction (II), the rolling pins 52 are forced by the inner surrounding edge 421 of the positioning plate 42 to move to the disengaging position against biasing forces of the biasing springs 53.

In an embodiment shown in FIGS. 1 and 2, the eccentric cam 47 may include two eccentric portions 471 which are opposite to each other in the direction of the axial line (L) (i.e., the front-rear direction (X)), and which are eccentric in different directions relative to the axial line (L). The cycloidal speed reducer 40 may include two of the cycloidal wheels 41, which are respectively coupled on the eccentric portions 471 through two bearing members 48.

In an embodiment shown in FIGS. 1 and 2, the annular force-transmitting member 44 has an inner rim surface 442 opposite to the outer rim surface 441. The contact rollers 451 are coupled among the inner rim surface 442 of the annular force-transmitting member 44 and two outer circumferences 411 of the cycloidal wheels 41.

Figure 4:
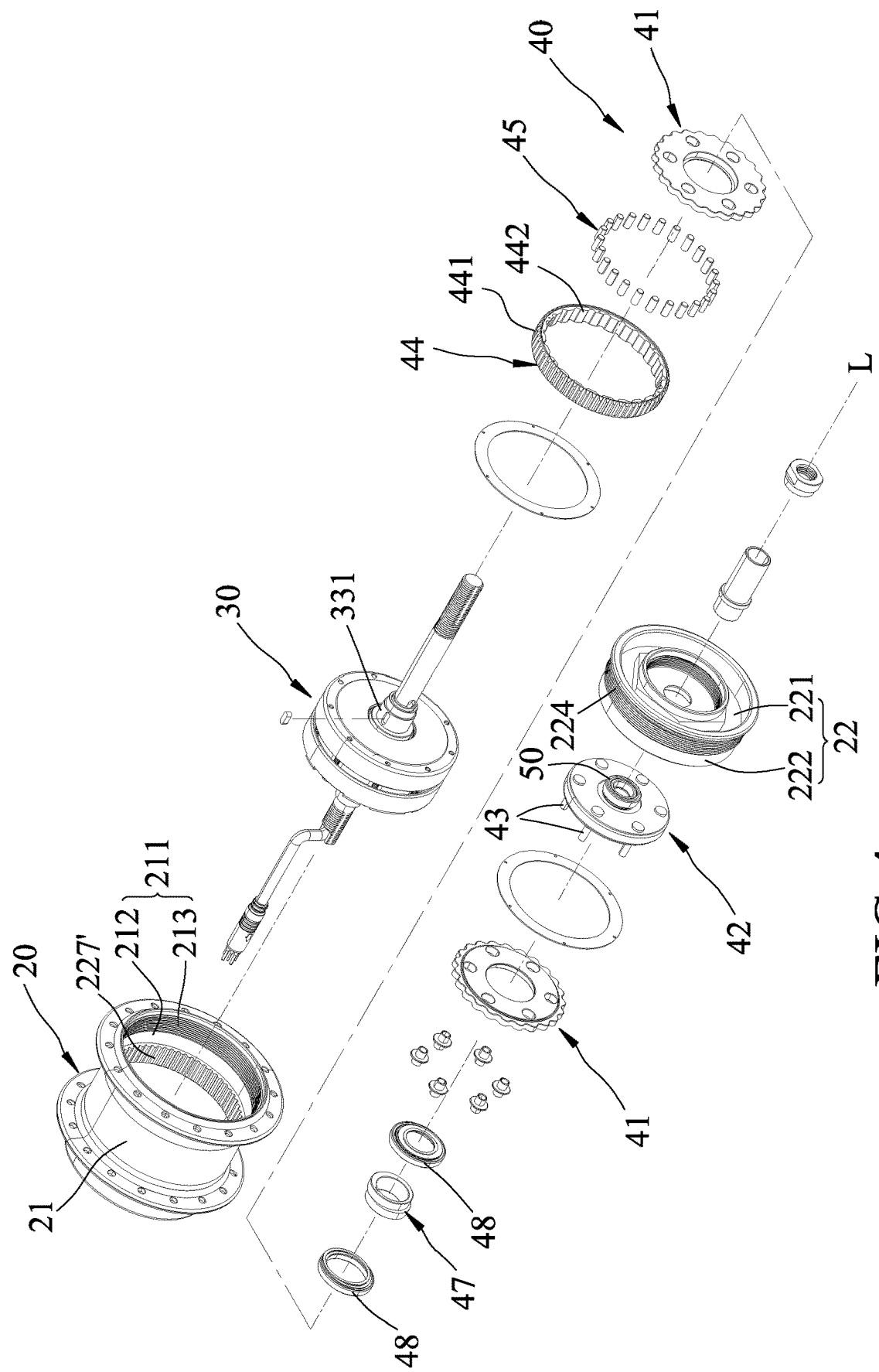
FIG. 4 is an exploded schematic perspective view of a hub motor assembly according to a second embodiment of the disclosure.
Figure 5:
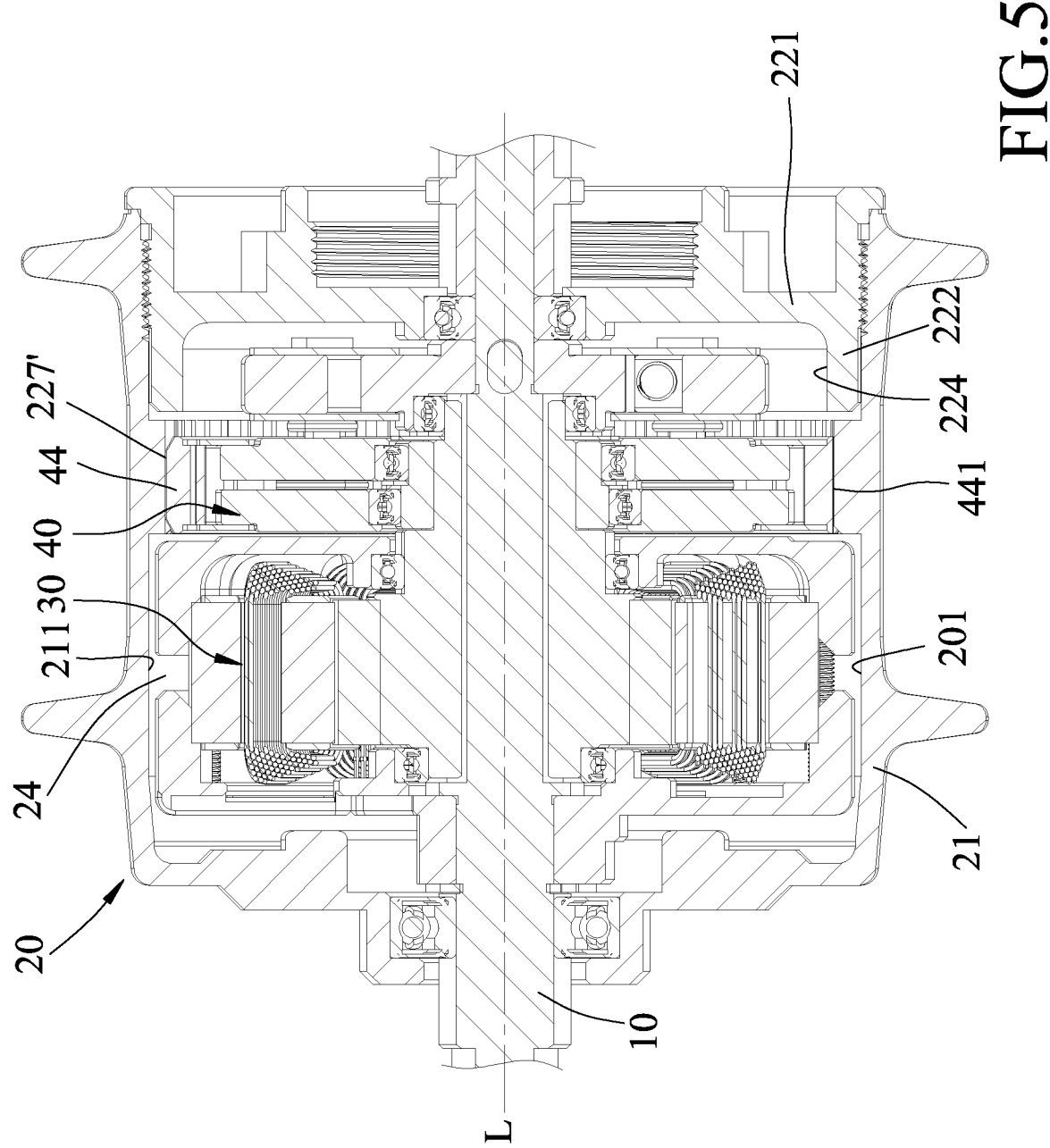
FIG. 5 is a fragmentary cross-sectional view of the second embodiment.

FIGS. 4 and 5 illustrate a hub motor assembly according to a second embodiment of the disclosure. The second embodiment is similar to the first embodiment except that in the second embodiment, the hub shell 20 has an inner spline 227' which is formed on the front surface region 212 of the surrounding wall 21, and which is configured to be brought into splined engagement with the outer rim surface 441 of the annular force-transmitting member 44.

Figure 6:
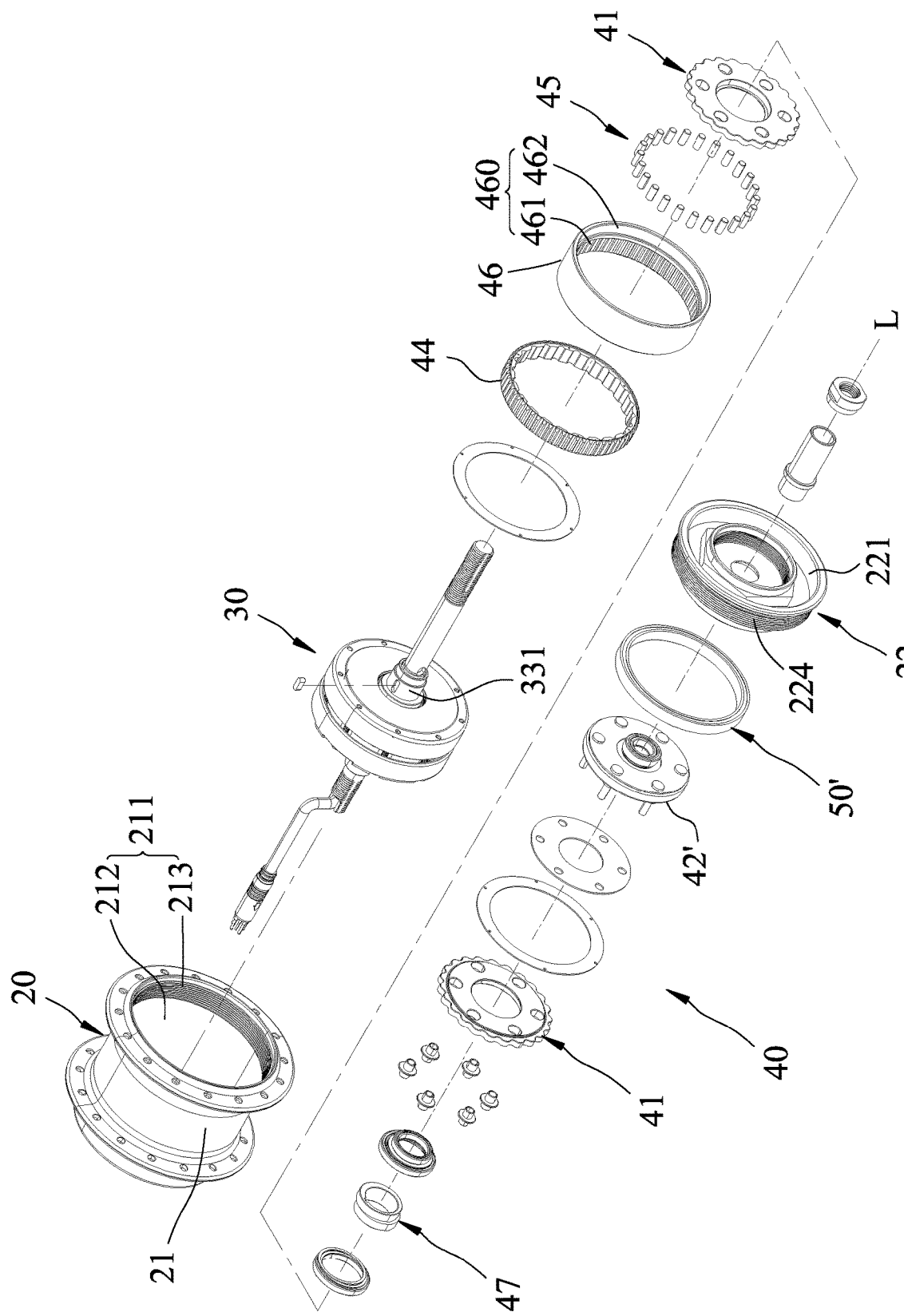
FIG. 6 is an exploded schematic perspective view of a hub motor assembly according to a third embodiment of the disclosure.
Figure 7:
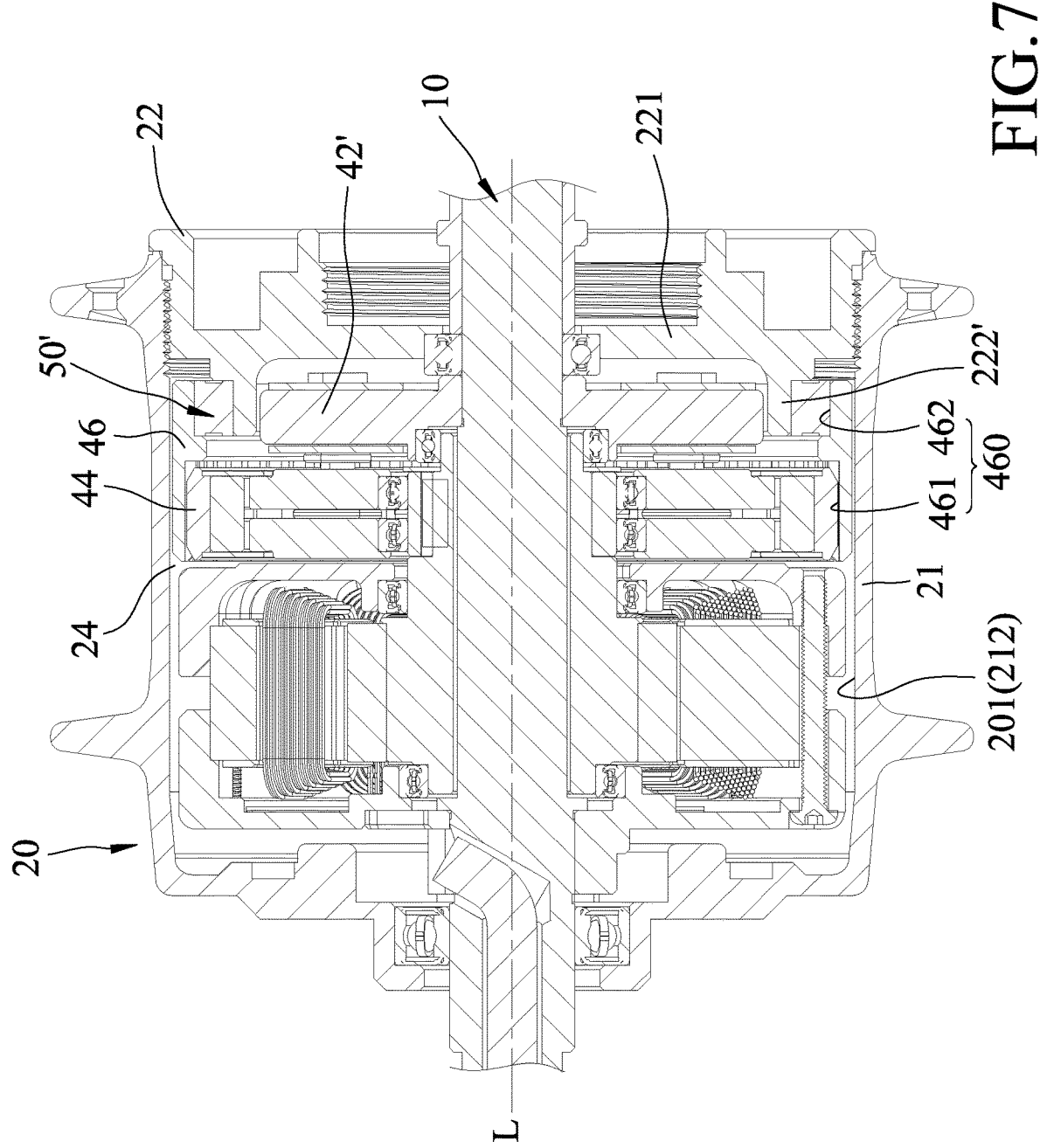
FIG. 7 is a fragmentary cross-sectional view of the third embodiment.

FIGS. 6 and 7 illustrate a hub motor assembly according to a third embodiment of the disclosure. The third embodiment is similar to the first embodiment except that in the third embodiment, a positioning plate 42' and a one-way clutch unit 50' replace the positioning plate 42 and the one-way clutch unit 50 in the first embodiment. The positioning plate 42' is secured on the hub axle 10, and the one-way clutch unit 50' is coupled between the hub shell 20 and the cycloidal speed reducer 40 to permit the hub shell 20 to rotate only in the first direction (I).

In an embodiment shown in FIG. 7, the front surface region 212 of the surrounding wall 21 serves as the inner surrounding surface 201 of the hub shell 20. A tubular wall 222' of the end cap 22 is mounted on the base wall 221 to surround the positioning plate 42', and is spaced apart from the surrounding wall 21.

In an embodiment shown in FIGS. 6 and 7, the cycloidal speed reducer 40 may further include a coupling sleeve 46 extending about the axial line (L) and having an inward surface 460 which includes a rear coupling region 462, and a front spline region 461 that is configured to be in splined engagement with the outer rim surface 441 of the annular force-transmitting member 41 so as to permit the coupling sleeve 46 to be driven by the annular force-transmitting member 41 to rotate. The tubular wall 222' is spaced apart from the rear coupling region 462.

In addition, the one-way clutch unit 50' is a one-way bearing, and is coupled between the tubular wall 222' and the rear coupling region 462 such that only when the output shaft 331 rotates in the first direction (I), can the hub shell 20 be driven by the coupling sleeve 46 to rotate in the first direction (I) through the tubular wall 222'. With the provision of the one-way bearing 50', when the output shaft 331 rotates in the second direction (II), the rotational force from the output shaft 331 is prevented from being transmitted to the hub shell 20.

Figure 8:
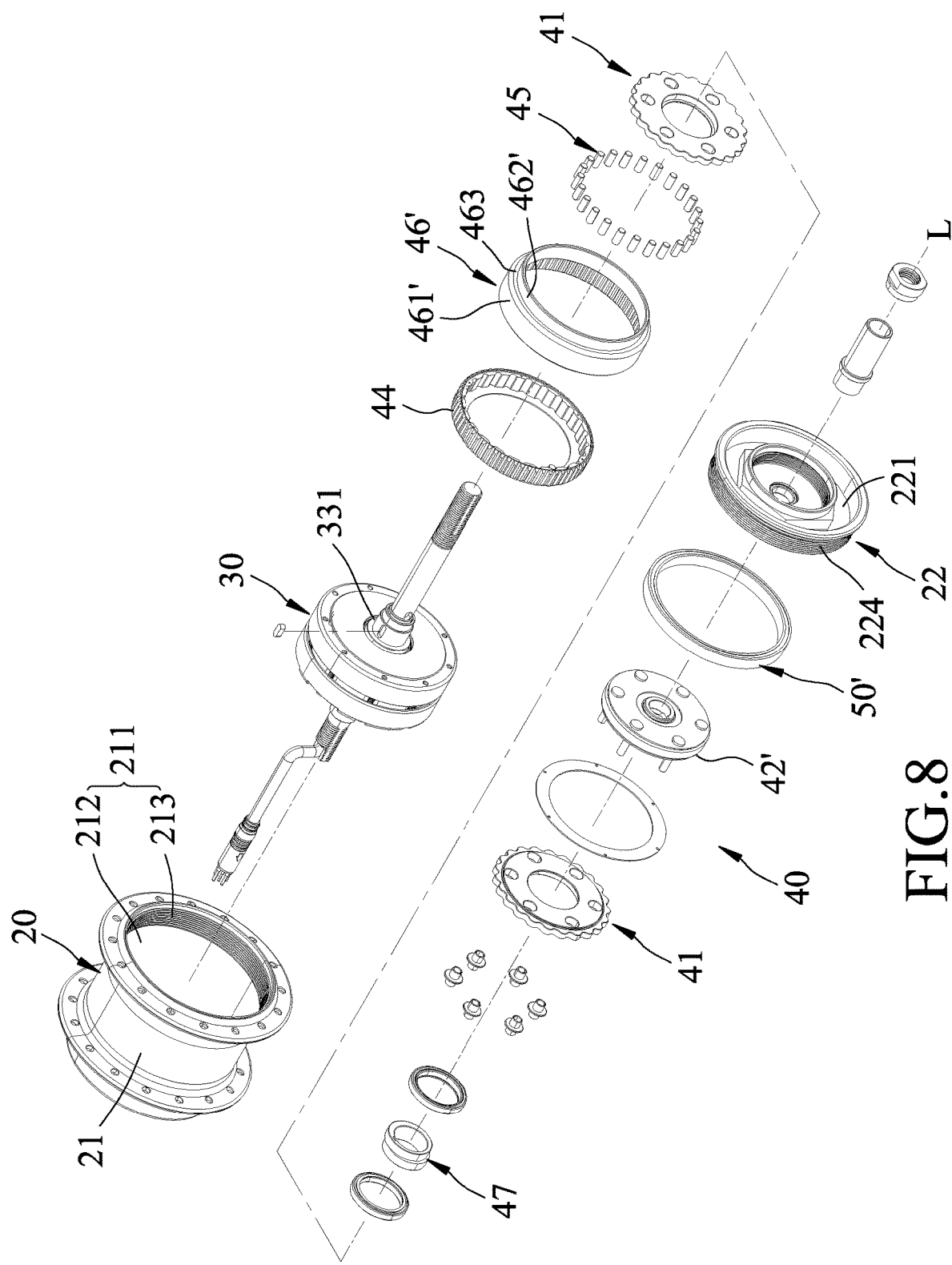
FIG. 8 is an exploded schematic perspective view of a hub motor assembly according to a fourth embodiment of the disclosure.
Figure 9:
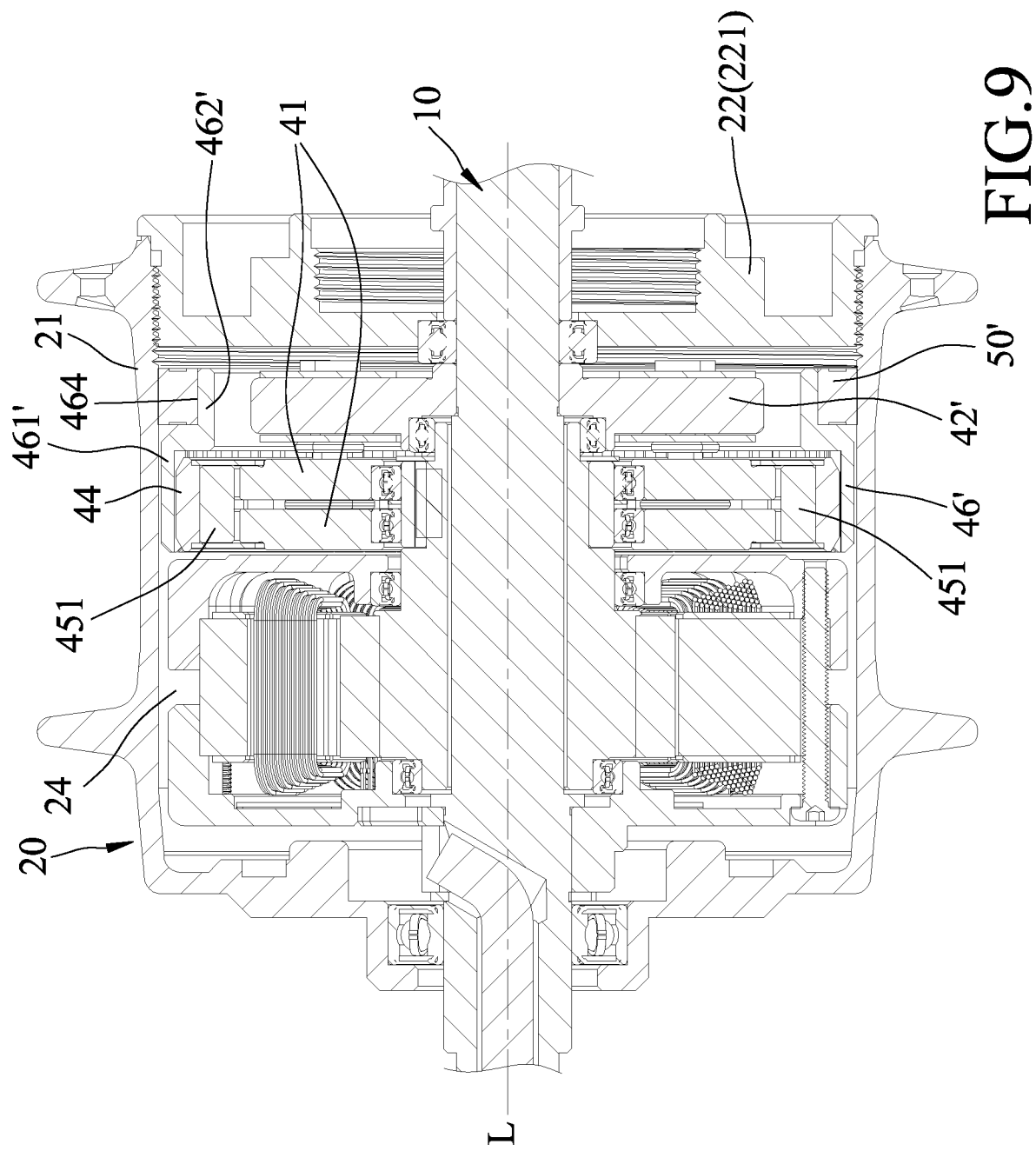
FIG. 9 is a fragmentary cross-sectional view of the fourth embodiment.

FIGS. 8 and 9 illustrate a hub motor assembly according to a fourth embodiment of the disclosure. The fourth embodiment is similar to the third embodiment except that in the fourth embodiment, the end cap 22 is not provided with the tubular wall 222' and a coupling sleeve 46' replaces the coupling sleeve 46 of the third embodiment.

The coupling sleeve 46' may include a front sleeve segment 461' and a rear sleeve segment 462'. The front sleeve segment 461' is configured to surround and is in splined engagement with the outer rim surface 441 of the annular force-transmitting member 41 so as to permit the coupling sleeve 46' to be driven by the annular force-transmitting member 41 to rotate. The rear sleeve segment 462' is spaced apart from the positioning plate 42', and has a smaller outer dimension than the front sleeve segment 461' so as to form an annular shoulder 463, and so as to permit the rear sleeve segment 462' to be spaced apart from the surrounding wall 21 by an annular gap 464.

In addition, the one-way clutch unit 50' (the one-way bearing) is disposed in the annular gap 464 to be coupled between the surrounding wall 21 and the rear sleeve segment 462' such that only when the output shaft 331 rotates in the first direction (I), can the hub shell 20 be driven by the coupling sleeve 46' to rotate in the first direction (I) through the surrounding wall 21. With the provision of the one-way bearing 50', when the output shaft 331 rotates in the second direction (II), the rotational force from the output shaft 331 is prevented from being transmitted to the hub shell 20.

Figure 10:
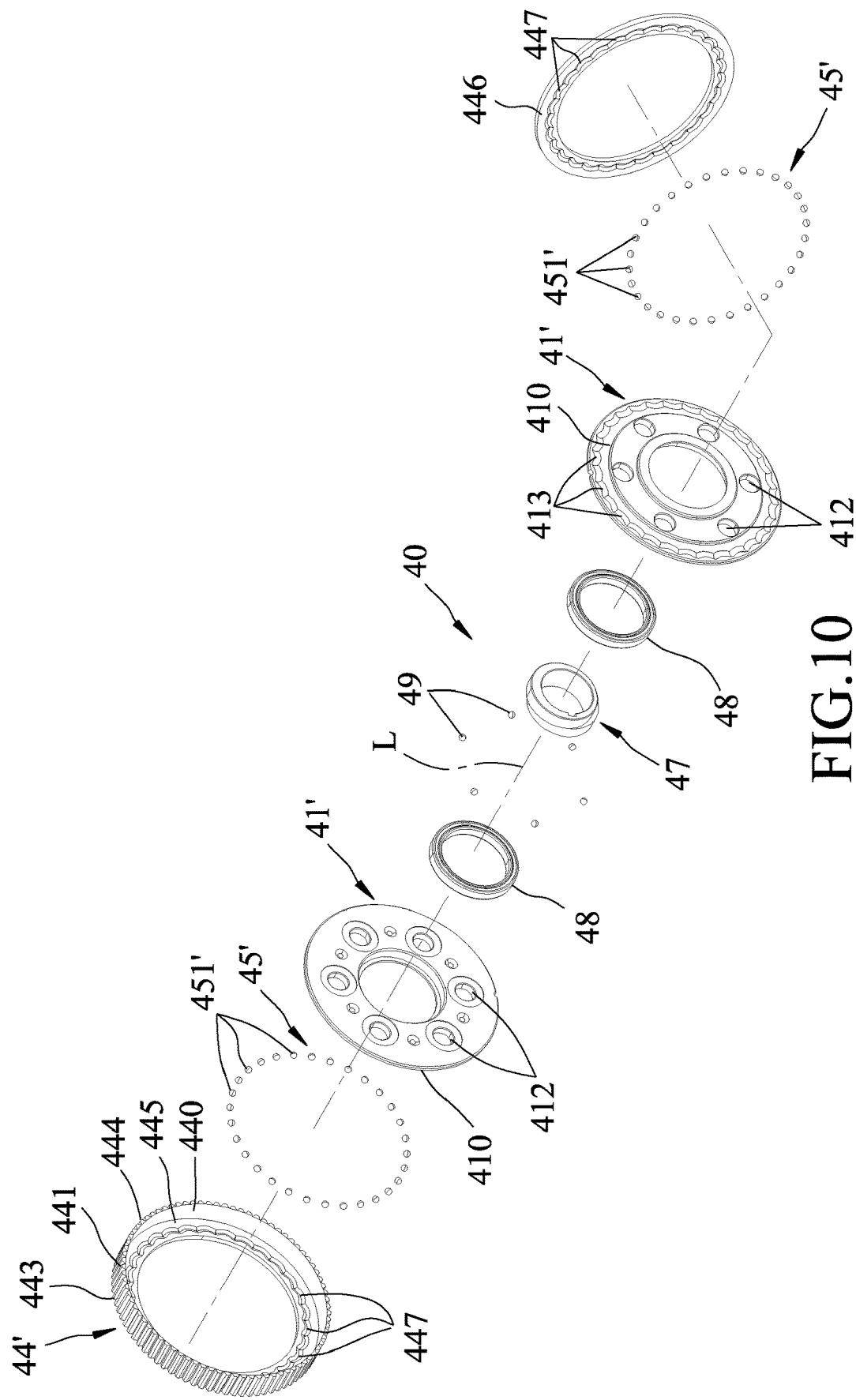
FIG. 10 is an exploded schematic perspective view of some elements of a hub motor assembly according to a fifth embodiment of the disclosure.
Figure 11:
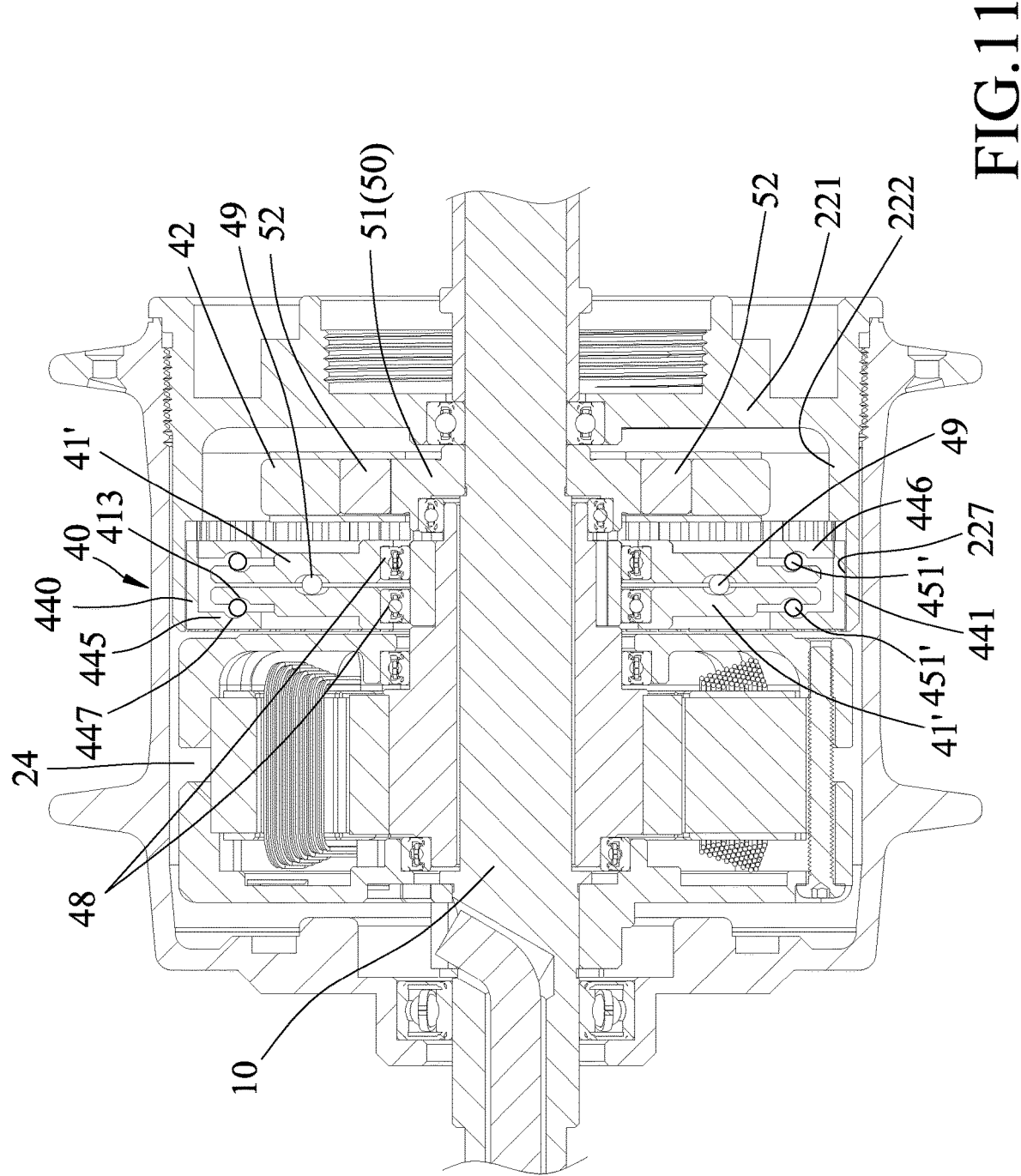
FIG. 11 is a fragmentary cross-sectional view of the fifth embodiment.

FIGS. 10 and 11 illustrate a hub motor assembly according to a fifth embodiment of the disclosure. The fifth embodiment is similar to the first embodiment except that in the fifth embodiment, two cycloidal wheels 41', an annular force-transmitting member 44', and two roller units 45' replace the cycloidal wheels 41, the annular force-transmitting member 44, and the roller unit 45 in the first embodiment.

The annular force-transmitting member 44' may include an annular wall 440, a front flange piece 445, and a rear flange piece 446. The annular wall 440 has the outer rim surface 441, a front annular periphery 443 and a rear annular periphery 444. The front and rear annular peripheries 443, 444 are disposed at two opposite sides of the outer rim surface 441. The front and rear flange pieces 445, 446 are disposed inwardly of the annular wall 440 and are respectively coupled to the front and rear annular peripheries 443, 444. Each of the front and rear flange pieces 445, 446 has a plurality of first curved grooves 447 which are angularly displaced from each other, and which are connected to each other.

Each of the cycloidal wheels 41' has an acting surface 410 which is disposed to confront a respective one of the front and rear flange pieces 445, 446, and which is formed with a plurality of second curved grooves 413. The second curved grooves 413 are angularly displaced from each other and are arranged to surround the through holes 412. The second curved grooves 413 are connected to each other.

Each of the roller units 45' includes a plurality of contact rollers 451', each of which is rollably retained between a respective one of the first curved grooves 447 of the front and rear flange pieces 445, 446 and a respective one of the second curved grooves 413 of the cycloidal wheels 41' so as to permit the eccentric cycloidal motions of the cycloidal wheels 41' to be transmitted to the annular force-transmitting member 44' through the roller units 45'. Each of the contact rollers 451' is in a form of a rolling ball.

In an embodiment shown in FIGS. 10 and 11, the cycloidal speed reducer 40 may further include a plurality of rolling balls 49 which are angularly displaced from each other, and which are in rolling contact between the cycloidal wheels 41'.

In sum, with the provision of the one-way clutch unit 50 or 50' and the cycloidal speed reducer 40 in the hub motor assembly, the hub motor assembly may have a relative high torque-to-volume ratio, and thus may be relatively lightweight.

In addition, the hub axle 10 is disposed to extend through the hub shell 20 to permit the hub shell 20 to rotate about the axial line (L) of the hub axle 10. Therefore, an evenly distributed force may be applied on the hub shell 20 for rotating the hub shell 20, and the hub motor assembly may be more durable and may be operated with minimum noise.

Furthermore, elements of the cycloidal speed reducer 40, which are modular designed, are easily assembled which reduces manufacturing cost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment (s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hub motor assembly comprising:
   a hub axle extending along an axial line;
   a hub shell mounted on and rotatable relative to said hub axle;
   a motor unit mounted inside said hub shell and including an output shaft configured to rotate about the axial line for outputting a rotational force;
   a cycloidal speed reducer mounted inside said hub shell, and including
      an eccentric cam mounted on and rotating with said output shaft,
      at least one cycloidal wheel coupled to be driven by said eccentric cam such that when said output shaft outputs the rotational force, said cycloidal wheel is permitted to move about the axial line,
      a positioning plate disposed aside of said cycloidal wheel in a direction of the axial line,
      a plurality of carrier pins mounted on said positioning plate, and coupled with said cycloidal wheel,
      an annular force-transmitting member coupled between said cycloidal wheel and said hub shell, and
      at least one roller unit including a plurality of contact rollers, and coupled between said cycloidal wheel and said annular force-transmitting member; and
   a one-way clutch unit coupled to said cycloidal speed reducer such that when said output shaft rotates in a first direction about the axial line, said cycloidal wheel is driven to produce an eccentric cycloidal motion relative to the axial line, to thereby drive rotation of said hub shell in the first direction, and such that when said output shaft rotates in a second direction opposite to the first direction, said hub shell is prevented from rotating with said output shaft.

2. The hub motor assembly according to claim 1,
   wherein said hub shell includes an inner surrounding surface which surrounds and is spaced apart from said hub axle so as to define a surrounding space therebetween;
   wherein said motor unit is disposed in said surrounding space, and said output shaft is in a sleeve form and is sleeved on and rotatable relative to said hub axle;
   wherein said cycloidal speed reducer is disposed in said surrounding space;
   wherein said cycloidal wheel has a plurality of through holes which are angularly displaced from each other;
   wherein said positioning plate has a forward surface confronting said cycloidal wheel;
   wherein said carrier pins extend from said forward surface of said positioning plate respectively through said through holes of said cycloidal wheel and are angularly displaced from each other to be arranged in a concentric manner with respect to the axial line, each of said carrier pins having an outer dimension smaller than a dimension of a respective one of said through holes of said cycloidal wheel such that when said output shaft rotates in the first direction, said cycloidal wheel, which is retained on said positioning plate through said carrier pins, is permitted to produce the eccentric cycloidal motion;

wherein said annular force-transmitting member has an outer rim surface which is coupled to drive rotation of said hub shell; and wherein said contact rollers are coupled between said annular force-transmitting member and said cycloidal wheel, and are angularly displaced from each other about the axial line, so as to permit the eccentric cycloidal motion of said cycloidal wheel to be transmitted to said annular force-transmitting member through said contact rollers, thereby driving rotation of said hub shell.

3. The hub motor assembly according to claim 2, wherein said positioning plate has an inner surrounding edge which defines a central bore to permit extension of said hub axle therethrough, said positioning plate being switchable from a non-rotatable state, where said positioning plate is non-rotatably retained on said hub axle through said one-way clutch unit to permit the eccentric cycloidal motion of said cycloidal wheel, to a rotatable state, where said positioning plate is rotatably retained on said hub axle to permit said cycloidal wheel to rotate with said positioning plate, so as to prevent rotation of said cycloidal wheel from being transmitted to said annular force-transmitting member through said contact rollers; and wherein said outer rim surface of said annular force-transmitting member is in splined engagement with said inner surrounding surface of said hub shell so as to permit said hub shell to be driven by said annular force-transmitting member to rotate.

4. The hub motor assembly according to claim 3, wherein said one-way clutch unit is disposed in said central bore of said positioning plate, and is coupled between said positioning plate and said hub axle such that when said output shaft rotates in the first direction, said positioning plate is in the non-rotatable state, and such that when said output shaft rotates in the second direction, said positioning plate is switched to the rotatable state.

5. The hub motor assembly according to claim 4, wherein said one-way clutch unit includes a disc mount secured on said hub axle and having an outer peripheral surface which is disposed to confront said inner surrounding edge of said positioning plate, said outer peripheral surface of said disc mount having a plurality of retaining recesses which are angularly displaced from each other about the axial line, each of said retaining recesses extending about the axial line to terminate at a shallow end region and a deep end region which has a larger depth than said shallow end region, a plurality of rolling pins which are disposed respectively in said retaining recesses, and which are movable between an engaging position, where said rolling pins are disposed respectively in said shallow end regions of said retaining recesses to be brought into frictional engagement with said inner surrounding edge of said positioning plate, thereby preventing rotation of said positioning plate relative to said hub axle, and a disengaging position, where said rolling pins are disposed respectively in said deep end regions of said retaining recesses to be disengaged from said inner surrounding edge of said positioning plate, thereby permitting rotation of said positioning plate relative to said hub axle, and a plurality of biasing springs which are respectively disposed in said retaining recesses to respectively bias said rolling pins to the engaging position such that when said output shaft rotates in the first direction, said rolling pins are kept in the engaging position, and such that when said output shaft rotates in the second direction, said rolling pins are forced by said inner surrounding edge of said positioning plate to move to the disengaging position against biasing forces of said biasing springs.

6. The hub motor assembly according to claim 3, wherein said hub shell includes a surrounding wall extending about the axial line and having an inner peripheral surface which includes a front surface region and a rear female threaded region, and an end cap including a base wall formed with an opening configured to permit extension of said hub axle therethrough, and having a male threaded periphery which is configured to be brought into threaded engagement with said rear female threaded region of said surrounding wall, and a tubular wall mounted on said end wall, and having an inner tubular surface such that when said male threaded periphery is in threaded engagement with said rear female threaded region of said surrounding wall, said front surface region of said surrounding wall and said inner tubular surface of said tubular wall cooperatively define said inner surrounding surface of said hub shell.

7. The hub motor assembly according to claim 6, wherein said hub shell has an inner spline which is formed on said inner tubular surface of said tubular wall, and which is configured to be brought into splined engagement with said outer rim surface of said annular force-transmitting member.

8. The hub motor assembly according to claim 6, wherein said hub shell has an inner spline which is formed on said front surface region of said surrounding wall, and which is configured to be brought into splined engagement with said outer rim surface of said annular force-transmitting member.

9. The hub motor assembly according to claim 3, wherein said eccentric cam includes two eccentric portions which are opposite to each other in the direction of the axial line, and which are eccentric in different directions relative to the axial line; and wherein said cycloidal speed reducer includes two of said cycloidal wheels which are respectively coupled on said eccentric portions through two bearing members.

10. The hub motor assembly according to claim 9, wherein said annular force-transmitting member has an inner rim surface opposite to said outer rim surface, said contact rollers being coupled among said inner rim surface of said annular force-transmitting member and two outer circumferences of said cycloidal wheels.

11. The hub motor assembly according to claim 9, wherein said annular force-transmitting member includes an annular wall having said outer rim surface, a front annular periphery and a rear annular periphery, said front and rear annular peripheries being disposed at two opposite sides of said outer rim surface, and a front flange piece and a rear flange piece which are disposed inwardly of said annular wall and which are respectively coupled to said front and rear annular peripheries, each of said front and rear flange pieces having a plurality of first curved grooves which are angularly displaced from each other, and which are connected to each other;

wherein each of said cycloidal wheels has an acting surface which is disposed to confront a respective one of said front and rear flange pieces, and which is formed with a plurality of second curved grooves, said second curved grooves being angularly displaced from each other and being arranged to surround said through holes, said second curved grooves being connected to each other; and wherein said cycloidal speed reducer includes two of said roller units, each of said contact rollers of each of said roller units being rollably retained between a respective one of said first curved grooves of said front and rear flange pieces and a respective one of said second curved grooves of said cycloidal wheels so as to permit the eccentric cycloidal motions of said cycloidal wheels to be transmitted to said annular force-transmitting member through said roller units.

12. The hub motor assembly according to claim 11, wherein said cycloidal speed reducer further includes a plurality of rolling balls which are angularly displaced from each other, and which are in rolling contact between said cycloidal wheels.

13. The hub motor assembly according to claim 2, wherein said positioning plate is secured on said hub axle, and said one-way clutch unit is coupled between said hub shell and said cycloidal speed reducer to permit said hub shell to rotate only in the first direction.

14. The hub motor assembly according to claim 13, wherein said hub shell includes
a surrounding wall extending about the axial line and having an inner peripheral surface which includes a front surface region and a rear female threaded region, and
an end cap including a base wall which is formed with an opening configured to permit extension of said hub axle therethrough, and which has a male threaded periphery configured to be brought into threaded engagement with said rear female threaded region of said surrounding wall, so as to permit said front surface region of said surrounding wall to serve as said inner surrounding surface of said hub shell.

15. The hub motor assembly according to claim 14, wherein said cycloidal speed reducer further includes a coupling sleeve extending about the axial line and having an inward surface which includes a rear coupling region, and a front spline region that is configured to be in splined engagement with said outer rim surface of said annular force-transmitting member so as to permit said coupling sleeve to be driven by said annular force-transmitting member to rotate;

wherein said end cap further includes a tubular wall which is mounted on said base wall to surround said positioning plate, and which is spaced apart from said rear coupling region; and wherein said one-way clutch unit is a one-way bearing, and is coupled between said tubular wall and said rear coupling region such that only when said output shaft rotates in the first direction, can said hub shell be driven by said coupling sleeve to rotate in the first direction through said tubular wall.

16. The hub motor assembly according to claim 14, wherein said cycloidal speed reducer further includes a coupling sleeve which includes
a front sleeve segment configured to surround and be in splined engagement with said outer rim surface of said annular force-transmitting member so as to permit said coupling sleeve to be driven by said annular force-transmitting member to rotate, and
a rear sleeve segment spaced apart from said positioning plate, and having a smaller outer dimension than said front sleeve segment so as to permit said rear sleeve segment to be spaced apart from said surrounding wall by an annular gap; and wherein said one-way clutch unit is a one-way bearing, and is disposed in said annular gap to be coupled between said surrounding wall and said rear sleeve segment such that only when said output shaft rotates in the first direction, can said hub shell be driven by said coupling sleeve to rotate in the first direction through said surrounding wall.

17. The hub motor assembly according to claim 2, wherein said motor unit further includes
a motor casing secured to said hub axle, and having a surrounding casing wall which surrounds and is spaced apart from said hub axle to define an inner chamber therebetween,
a stator disposed in said inner chamber and mounted on said surrounding casing wall to be spaced apart from said hub axle, and
a rotor sleeve disposed in said inner chamber, and sleeved on and rotatable relative to said hub axle about the axial line, said output shaft extending rearwardly from said rotor sleeve to be exposed rearwardly from said motor casing and to rotate with said rotor sleeve so as to output the rotational force.

* * * * *